May 26, 1970 W. E. KEMP 3,514,317
METHOD OF COATING A METAL SUBSTRATE WITH COAL TAR ENAMEL
AND PRODUCT PRODUCED THEREBY
Filed Jan. 23, 1967
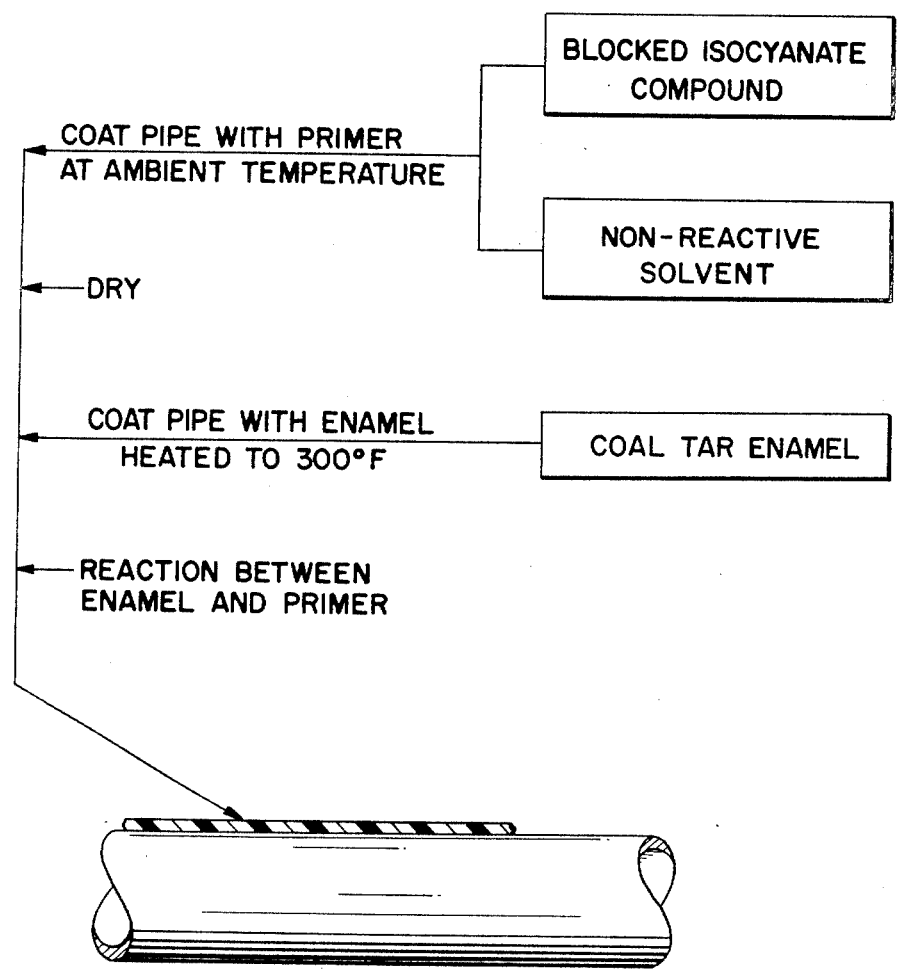
INVENTOR.
WOODROW E. KEMP
BY John P. Taylor
his Attorney 3,514,317
METHOD OF COATING A METAL SUBSTRATE
WITH COAL TAR ENAMEL AND PRODUCT
PRODUCED THEREBY
Woodrow E. Kemp, Pittsburgh, Pa., assignor to Koppers
Company, Inc., a corporation of Delaware
Filed Jan. 23, 1967, Ser. No. 610,950
Int. Cl. B44d 1/14; B32b 15/04
U.S. Cl. 117—75                                         10 Claims

ABSTRACT OF THE DISCLOSURE

A reactive primer containing phenol-blocked isocyanate molecules having a molecular weight over 200 is applied to a metal substrate at ambient temperatures. Subsequent application of a coal tar enamel at a temperature above 300° F. causes the isocyanate groups to unblock and to bond to the substrate and the enamel. The phenol-blocked isocyanate compound is essentially the sole constituent of the primer.

BACKGROUND OF THE INVENTION

Coal tar enamel has a long successful history as a coating for pipe for the prevention of corrosion. It has been the standard for coating water pipe and oil and gas pipe for years. However, the enamel does not adhere well to such pipe. In the application of coal tar enamel to pipe, the pipe must first be primed and then the enamel adheres to the primer and protects the pipe. Unless this adhesion between the pipe and primer and the primer and enamel is almost perfect under the temperature range anticipated, the coating may lose bond with the pipe. With water pipe, which is coated on both the exterior and interior, the adhesion of the interior coating is critical because if it loses bond, lines and meters will become plugged and inoperative, in addition to the onset of corrosion. On oil and gas lines, which are coated on the exterior, soil stress will rapidly remove enamel which has a bond deficiency. The problem is magnified when the lines are carrying oil or hot gases whose temperature tends to soften the primer and enamel, particularly affecting the adhesion through a lowering of tensile and cohesive strength. Oil lines, for example, are being heated to higher temperatures in order to reduce viscosity and increase flow rates, and gas lines are always at an elevated temperature for some distance downstream from a compressor station, and the tendency also is for temperatures to be increasingly higher as more compressors are added to increase the carrying capacity of the lines.

Primers based on a solution of coal tar pitch in a solvent were the first, and for many years, the only type primer employed. They were characterized by long drying times, low shelf and exposure life, and unpredictability in regard to bonding power with any specific enamel formulation., Many resin systems were tried over the years as primers in an effort to overcome the deficiency of coal tar primers without success. Immediate and long-term incompatibility with the enamel always resulted. About ten years ago, a resin system was finally found which showed none of the previous deficiencies. It dried rapidly, had long shelf and exposure life, and bonded all enamels irrespective of formulation. It was based primarily on chlorinated natural rubber. This primer has now been almost universally adopted by applicators of waterworks and is specified and approved by the waterworks industry.

The oil and gas industry attempted to adopt this synthetic primer for their enamel coating applications, but found it had one serious deficiency (in common with all chlorinated rubber compositions) namely, instability at temperatures over 140° F. for longer than 3–4 days. As gas and oil lines commonly operate at temperatures over 180° F. to as high as 210° F. (using special enamels) the fact that chlorinated rubber primers bonded the enamel to the substrate at normal temperature was of little value. Up until now, oil and gas lines were forced to use coal tar primers because the only synthetic primer available was not stable under their operation conditions.

Unfortunately, even coal tar pitch solvent primers are not always satisfactory under field operating conditions, and it is necessary to carefully match a primer with a specific batch of enamel to ensure a reasonable bond which is an expensive process.

These problems have led some to abandon the primer altogether in favor of single application coating systems which contain reactive ingredients which may be mixed together just prior to application.

For example, U.S. Pat. No. 3,092,594 teaches a coal tar based coating wherein the coal tar pitch is modified first by reacting it at an elevated temperature with an alkylene oxide and/or alkylene carbonate to produce side chains containing terminal hydroxyl groups capable of reacting with isocyanate groups. After cooling, the modified coal tar pitch is mixed with either a blocked or unblocked isocyanate and applied to a substrate. The coating may be applied hot or cold. However, the pot life would be relatively short and only small quantities could be used at one time. Even if a blocked isocyanate is used, the isocyanates will begin reacting as soon as the unblocking temperature is reached. If the coating (using a blocked isocyanate) is applied without heat, a subsequent bake is necessary to release the isocyanate.

U.S. Pat. No. 3,182,032 teaches a coal tar based coating containing triisocyanates and curing agents such as hydroxyl-containing compounds. The isocyanates are not blocked, and hence, the coating will cure at ambient temperatures. However, the coating must be packaged as a two-component system with the component containing the isocyanate and the component containing the curing agent being mixed just prior to application. The patent distinguishes triisocyanates and diisocyanates when used in ambient temperature cured coatings.

SUMMARY OF THE INVENTION

I have found that a primer consisting essentially of a blocked polyisocyanate is effective for use in conjunction with coal tar enamel. The blocked isocyanate is capable, when the coal tar is applied hot, of unblocking, thereby providing free isocyanate groups to form bonds with the reactive constituents in the coal tar and in addition to bond the coating to the metal substrate. The use of a blocked isocyanate in the primer is essential. Unblocked isocyanates are either highly toxic, too volatile, or are effected by atmospheric moisture. The blocking of the isocyanate with a monohydric phenol permits the active functional isocyanate group to become available at the appropriate time for reaction with the coal tar. In the preferred embodiment of my invention, the reaction to form a tough resistant bond between the coal tar enamel and the substrate is very rapid. If the size of the isocyanate molecule used in the coal tar is too small, that is, if the relative molecular weight of the isocyanate in comparison with the molecular weight of the monohydric phenol used as the blocking agent is too small, the rate of cure is slowed down considerably because of the problem of phenol removal. (The isocyanate-phenol reaction is reversible.) The enamel coating prevents the escape of the phenol and the rate of cure is thus dependent upon the rate of the diffusion of the phenolic body into the coal tar enamel constituent. The molecular weight of the isocyanate compound (without the monohydric phenol)

must therefore comprise at least 50% by weight of the total weight of the blocked isocyanate compound including the monohydric phenol blocking members. This insures that the amount of phenol relative to the total weight of the primer is sufficiently low to prevent slow down of the reaction by inability of the phenol to escape and diffuse into the enamel.

In accordance with this invention, the metal subtrate is primed at ambient temperature with a primer consisting essentially of a blocked polyisocyanate having a plurality of phenol blocked isocyanate groups, said blocked polyisocyanate being formed by the reaction of the isocyanate groups with a monohydric phenol, the blocked polyisocyanates having a molecular weight exclusive of the blocking monohydric phenol of at least 200. Coal tar enamel, at an elevated temperature of at least 300° F. is then applied over the primer, which temperature will cause the primer to generate isocyanates which react to form bonds in the nature of the chemical bonds between the coal tar enamel and the metal.

In accordance with this invention, the conventional treatment of pipe with a primer and later with a coal tar enamel can be carried out. However, in accordance with this invention, at the temperatures of application of the enamel to the primed substrate, a reaction occurs between the enamel and the primer to provide an adhesion which has the resemblance of a chemical bond between the enamel and the substrate surface. Accordingly, with this invention, the present practices of protecting pipe coatings, with which those working in the field are familiar, do not need to be altered to obtain these surprising results of the invention.

DETAILED DESCRIPTION

The blocked isocyanate primer generates reactive isocyanates upon being heated by volatilization of the phenol blocking groups. The free isocyanate groups then react with the coal tar enamel and the metal as the coal tar cools forming bonds in the nature of chemical bonds.

The primer is initially formed by the esterification of a compound containing a plurality of isocyanate groups with monohydric phenols to form carbamate type esters.

The isocyanate+phenol reaction to form the carbamate ester as typically illustrated in Equation I below is reversible with heat. Therefore, while the primer is stable at its application temperature, the heat of the coal tar enamel causes the reverse reaction to occur thus freeing the isocyanate:

I.

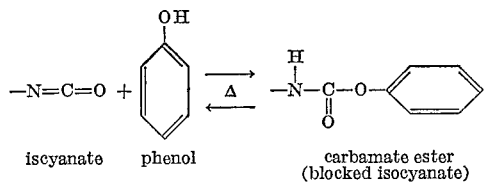

iscyanate   phenol        carbamate ester
                                   (blocked isocyanate)

Suitable isocyanate compounds containing a plurality of isocyanate groups which may be blocked by reaction with monohydric phenols are those having a molecular weight higher than 200. Molecular weights lower than 200 necessitate the addition of other constituents such as hydroxyl polyesters, polyethers and the like to hasten the curing of the isocyanate by the reaction of the isocyanate with the hydroxyl groups after removal of the phenol blocking groups. Addition of such constituents to the coating is undesirable because of their low moisture resistance. In contrast, the blocked polyisocyanate primer of this invention contains no such additives. Polyisocyanate compounds useful in this invention are the following:

(a) Naphthalene isocyanates having the following structure:

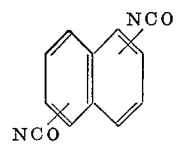

such as 1,5-naphthalene diisocyanate.

(b) Bis-phenylene diisocyanates and bis-phenylene triisocyanates having the following structure:

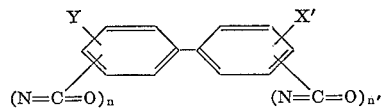

where X and X' are the same or different and are selected from the group consisting of hydrogen, halogen, lower alkyl, lower alkoxy and phenyl; and $n$ and $n'$ are each 1–2 and the sum of $n+n'$ is from 2–3.

Examples of isocyanates corresponding to the above formula include: 4,4'-diisocyanato biphenyl; 3,3'-dimethyl-4,4'-diisocyanato biphenyl; 3,3'-dimethoxy-4,4'-diisocyanato biphenyl; 3,3'-diphenyl-4,4'-diisocyanato biphenyl; 3,3'-dichloro-4,4'-diisocyanato biphenyl; 2,4,4'-triisocyanato biphenyl; 2,3',4-triisocyanato-4'-methyl biphenyl; 2,4,4'-triisocyanato-3'-methyl biphenyl; 2,4,4'-triisocyanato-5-methyl biphenyl; 2,2',4-triisocyanato-5-methyl biphenyl; 2,4,4'-triisocyanato-6-chloro biphenyl; 2,3',4-triisocyanato-4',5-dimethyl biphenyl; 2,4,4'-triisocyanato-3'-methoxy - 5 - methyl biphenyl; 2,4,4'-triisocyanato-3',5-dichloro diphenyl; 2,2',4-triisocyanato-5,5'-dichloro diphenyl; 2,3',4-triisocyanato - 4' - methoxy diphenyl; 2,4,4'-triisocyanato-3'-methoxy diphenyl; 2,4,4'-triisocyanato-5-methoxy diphenyl; 2,2',4-triisocyanato-5-methoxy diphenyl; 2,4,4'-triisocyanato-5-chloro diphenyl; 2,3',4-triisocyanato - 4' - chloro diphenyl; 2,4,4'-triisocyanato-3'-chloro diphenyl; 2,2',4-triisocyanato-5-chloro diphenyl.

(c) Isocyanato-bis-phenylene ethers, bis-phenylene alkylene ethers and isocyanato-bis-phenylene alkanes having the following structure:

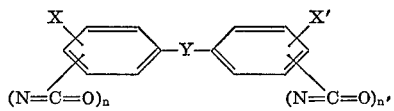

where X and X' are the same or different and are selected from the group consisting of hydrogen, halogen, lower alkyl, lower alkoxy and phenyl; Y is —O—, —R— or —ROR'— wherein R and R' are the same or different aliphatic saturated hydrocarbon radicals having from 1–6 carbon atoms; and $n$ and $n'$ are each 1–2 and the sum of $n+n'$ is from 2–3.

Examples of isocyanates corresponding to the above formula include:

4,4'-diisocyanato-diphenylene ether;
3,3-dimethyl-4,4'-diisocyanato-diphenylene ether;
3,3'-dimethoxy-4,4'-diisocyanato-diphenylene ether;
3,3'-dichloro-4,4'-diisocyanato-diphenylene ether;
3,3-diphenyl-4,4'-diisocayanato-diphenylene ether;
4'-methyl-2,3',4-triisocyanato-diphenylene ether;
5-methoxy-2,4,4'-triisocyanato-diphenylene ether;
6-chloro-2,4,4'-triisocyanato-diphenylene ether;
4,4'-diisocyanato-diphenyl methane,
3,3'-dimethyl-4,4'-diisocyanato-diphenylene methane;
3,3'-dimethoxy-4,4'-diisocyanato-diphenylene methane;
3,3'-dichloro-4,4'-diisocyanato-diphenylene methane;
3,3'-diphenyl-4,4'-diisocyanato-diphenylene methane;
4,4'-diisocyanato-diphenylene ethane;
bis(4-isocyanato-phenylene methylene)ether;
bis(3-methyl-4-isocyanato-phenylene ethylene)ether;
bis(3-chloro-4-isocyanato-phenylene methylene)ether;
bis(3-methoxy-4-isocyanato-phenylene methylene)ether.

(d) Isocyanato-tris-phenylene alkanes having the following structure:

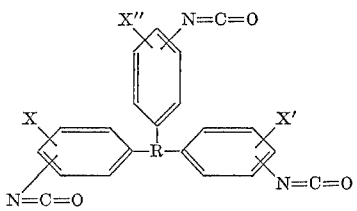

R is a trifunctional aliphatic saturated hydrocarbon radical having from 1–6 carbon atoms.

X, X′ and X″ are the same or different and are selected from the group consisting of hydrogen, halogen, lower alkyl, lower alkoxy and phenyl.

Examples of isocyanatos corresponding to the above formula include: 4,4′,4′″-triisocyanato-triphenylene methane; tris(3-methyl-4-isocyanato-phenylene)methane; tris(3 - methoxy - 4 - isocyanato - phenylene)methane; tris(3-chloro-4-isocyanato-phenylene)methane.

(e) Polymethylene polyphenyl polyisocyanates having the following structure:

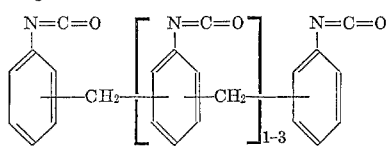

(f) Also useful are adducts made from the above compounds by reacting 3 moles of the isocyanate compound with a polyhydroxy compound such as a triol or a polyether. One of the isocyanate radicals reacts with a hydroxyl to form a carbamate ester or urethane linkage while the other isocyanate (or isocyanates if a triisocyanate is reacted with the polyol) does not react with the polyol, but is later blocked by reaction with a phenol.

If adducts are used, some of the lighter isocyanates not useful by themselves in this invention such as 2,4-toluene diisocyanate, 2,6-toluene diisocyanate, and hexamethylene diisocyanate can be used in the adduct.

Such adducts have the general structural formula:

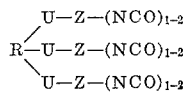

where R is a trifunctional aliphatic saturated hydrocarbon radical having from 1–6 carbon atoms or a polyether radical having a molecular weight of up to 20,000. U represents the urethane linkage:

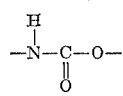

formed by the hydroxyl and isocyanate, and Z represents the isocyanate compounds previously described.

Examples of useful polyhydroxy compounds include: 1,2,3-propanetriol; 1,2,3-trimethylol propane; 3-methylol-2,4-pentanediol; 1,2,6 - hexanetriol; 2,2′-dimethylol-1,3-propanediol (pentaerythritol); polyoxypropylene triol.

Suitable monohydric phenols which may be used as blocking agents include phenol, monomethylphenols, chlorophenols, nitrophenols, o-methoxyphenol, 1,2-benzenediol, 1,3-benzenediol, and 1,3,5-benzenetriol.

The blocked isocyanate is mixed with a non-reactive solvent such as, for example, xylene, toluene, ethyl acetate, Cellosolve acetate, ketones or nitro compounds such as nitropropane, nitrobenzene or the like. The amount of solvent used will depend on the desired consistency of the primer for the mode of application such as brushing, dipping, or spraying, or the like. A concentration of about, for example, 30% by weight solids is usually satisfactory. If the particular compound is insoluble in the above solvents, it may be emulsified in water.

The coal tar enamels used in the system are well known in the art and readily available. The critical limitation in the use of the enamel in the invention is that the enamels must be applied at temperatures above 300° F. to ensure unblocking of the isocyanate in the primer. Suitable coal tar enamels are commercially available as bitumastic coatings from the Koppers Company, Inc. They are normally hot applied at a temperature above 300° F. in the thicknesses of about 100 mils. The enamel may be applied by pouring, spreading, mopping, brushing, or the like.

The invention will be more clearly understood by referring to the appended flow sheet and the following examples.

EXAMPLE I 90 grams of a phenol-blocked isocyanate adduct sold under the trademark Mondur S (an adduct formed by reacting a molar amount of trimethylol propane with 3 moles of toluene diisocyanate) was dissolved in 300 grams of methyl ethyl ketone. The solution was applied as a primer to a bare metal substrate at ambient temperatures as a thin (approximately 1 mil) film and allowed to dry. A coal tar enamel was heated to a temperature of 475° F. and then applied over the primer at this temperature. The heat of the enamel raised the primer to an unblocking temperature causing the isocyanate groups to unblock and cross-link with the enamel and firmly bond the enamel to the metal substrate. Subsequent examination of the coating, including chipping off portions of the enamel, confirmed that the enamel had formed an excellent bond through the reactive primer with the metal substrate.

Similar results were achieved using the phenol-blocked adducts of 3-methylol-pentylene glycol-2,4 reacted with toluene diisocyanate in a molar ratio of 1:3 and 3-methylol-pentylene glycol-2,4 reacted with hexamethylene diisocyanate in a molar ratio of 1:3.

EXAMPLE II 100 grams of phenol-blocked diphenyl methane p,p′-diisocyanate were emulsified in 330 grams of water. The emulsion was applied to a bare metal substrate at ambient temperatures as a thin film about ½ mil thickness. As in Example I, a coal tar enamel heated to 475° F. was applied to the primed substrate. After cooling, the coating was examined and found to have formed an excellent bond with the substrate.

The same results were obtained using phenol-blocked isocyanates of dianisidine diisocyanate, triphenyl methane p,p′,p″-triisocyanate and polymethylene polyphenyl diisocyanate.

The invention thus provides a system whereby a coal tar enamel may be bonded to a metal substrate by means of a reactive primer which is activated by the application of the hot coal tar enamel. The chemical bonds formed by the isocyanate-containing primer are stable, enabling the continuous and sustained use of the coated pipe at high temperatures, i.e. over 180° F., up to as high 220° F. Both the enamel and the primer are stable and capable of good storage and pot life; the enamel because it does not contain reactive additives, and the primer because it is applied at ambient temperatures which are well below the critical temperature at which its constituents become reactive. Although the invention has been illustrated with coal tar enamel, it should be understood that the use of the primer with any hot applied enamel including bituminous enamels derived from either coal tar or asphalt, is within the scope of the invention.

I claim:

1. A method of coating a metal substrate with coal tar enamel to protect the metal substrate against corrosion which comprises:

(a) priming the metal substrate at ambient temperatures with a primer consisting essentially of a blocked polyisocyanate having a plurality of phenol-blocked isocyanate groups capable of unblocking upon being heated, said blocked isocyanate primer being formed by reacting a compound containing reactive isocyanate groups with a monohydric phenol to block said isocyanate groups; and (b) applying the coal tar enamel over the primer at an elevated temperature of at least 300° F., which temperatutre will cause the blocked isocyanate to unblock and thereby to generate reactive isocyanates which react to bond the coal tar enamel to the metal substrate.

2. The method of claim 1 wherein the compound containing isocyanate groups has a molecular weight of at least 200 and is selected from the group consisting of naphthalene diisocyanates, bis-phenylene diisocyanates, bis-phenylene triisocyanates, isocyanato-bis-phenylene ethers, isocyanato-bis-phenylene alkylene ethers, isocyanato-bis-phenylene alkanes, isocyanato-tris-phenylene alkanes, polymethylene polyphenyl isocyanates, and adducts formed by reacting a polyhydroxy compound and a polyisocyanate wherein at least one but less than all of the isocyanate groups in the polyisocyanate react with the polyhydroxy compound to form urethane linkages.

3. The method of claim 1 wherein the blocked polyisocyanate is a phenol blocked adduct formed by first reacting trimethylol propane with toluene diisocyanate and then blocking the adduct with a monohydric phenol.

4. The method of claim 1 wherein the blocked polyisocyanate is phenol blocked polymethylene polyphenyl isocyanate.

5. The method of claim 1 wherein the blocked polyisocyanate is phenol blocked triphenylmethane p,p′,p″-triisocyanate.

6. The method of claim 1 wherein the blocked polyisocyanate is a phenol blocked adduct formed by first reacting 3-methylol, 2,4-pentanediol with toluene diisocyanate and then blocking the adduct with a monohydric phenol.

7. The method of claim 1 wherein the blocked polyisocyanate is a phenol blocked adduct formed by first reacting 3-methylol, 2,4-pentanediol with hexamethylene diisocyanate and then blocking the adduct with a monohydric phenol.

8. The method of claim 1 wherein the blocked polyisocyanate is phenol blocked diphenyl methane diisocyanate.

9. The method of claim 1 wherein the blocked polyisocyanate is phenol blocked dianisidine diisocyanate.

10. A coated metal substrate produced according to the method of claim 1.

References Cited

UNITED STATES PATENTS

| | | | |
|---|---|---|---|
| 3,024,130 | 3/1962 | Kish | 117—75 |
| 3,092,594 | 6/1963 | Heiss | 260—28 X |

WILLIAM D. MARTIN, Primary Examiner

R. HUSACK, Assistant Examiner

U.S. Cl. X.R.

117—94, 97, 92, 132; 260—77.5